(12) United States Patent
Nishikawa

(10) Patent No.: US 7,892,672 B2
(45) Date of Patent: Feb. 22, 2011

(54) POLYOLEFIN MICROPOROUS MEMBRANE BASE FOR NONAQUEOUS SECONDARY BATTERY SEPARATOR, METHOD FOR PRODUCING THE SAME, NONAQUEOUS SECONDARY BATTERY SEPARATOR AND NONAQUEOUS SECONDARY BATTERY

(75) Inventor: Satoshi Nishikawa, Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 12/663,261

(22) PCT Filed: Jun. 4, 2008

(86) PCT No.: PCT/JP2008/060281

§ 371 (c)(1),
(2), (4) Date: Dec. 4, 2009

(87) PCT Pub. No.: WO2008/149895

PCT Pub. Date: Dec. 11, 2008

(65) Prior Publication Data

US 2010/0178544 A1    Jul. 15, 2010

(30) Foreign Application Priority Data

Jun. 6, 2007   (JP) .............................. 2007-150127

(51) Int. Cl.
*H01M 2/14* (2006.01)
(52) U.S. Cl. ....................... 429/129; 429/144; 429/145; 429/247
(58) Field of Classification Search .................. 429/129, 429/145, 247
See application file for complete search history.

(56) References Cited

U.S. PATENT DOCUMENTS

2002/0034689 A1   3/2002   Hoshida et al.

2004/0157118 A1 *  8/2004   Uetani et al. ................. 429/144

FOREIGN PATENT DOCUMENTS

| | | |
|---|---|---|
| JP | 11-123799 A | 5/1999 |
| JP | 11-158304 A | 6/1999 |
| JP | 2000-100408 A | 4/2000 |
| JP | 2000-108249 A | 4/2000 |
| JP | 2000-248093 A | 9/2000 |
| JP | 2001-023600 A | 1/2001 |
| JP | 2001-23602 A | 1/2001 |
| JP | 2001-266949 A | 9/2001 |
| JP | 2002-69221 A | 3/2002 |
| JP | 2002-190291 A | 7/2002 |
| JP | 2002-355938 A | 12/2002 |
| JP | 2003-040999 A | 2/2003 |
| JP | 2003-059477 A | 2/2003 |
| JP | 2004-349146 A | 12/2004 |
| JP | 2005-209570 A | 8/2005 |
| JP | 2006-027024 A | 2/2006 |
| JP | 2006-054127 A | 2/2006 |
| JP | 2006-111712 A | 4/2006 |
| JP | 2006-273987 A | 10/2006 |
| JP | 2006-289657 A | 10/2006 |
| JP | 2006-307193 A | 11/2006 |
| JP | 2007-125821 A | 5/2007 |

* cited by examiner

*Primary Examiner*—Patrick Ryan
*Assistant Examiner*—Ben Lewis
(74) *Attorney, Agent, or Firm*—Sughrue Mion, PLLC

(57) ABSTRACT

A nonaqueous secondary battery separator is provided that is excellent in heat resistance, shutdown characteristics, membrane resistance and handling property. The present invention is a polyolefin microporous membrane used for a nonaqueous secondary battery separator containing the polyolefin microporous membrane at least one surface of which is coated and integrated with a heat resistant porous layer, characterized in that the membrane has (A) a thickness of 5 to 20 µm, (B) a porosity of 35 to 50%, (C) an air permeability per unit thickness (JIS P8117) of 10 to 30 sec/100 cc·µm and a total air permeability of the membrane (JIS P8117) of 400 sec/100 cc or less, and (D) Y/X of $1\times10^{-3}$ to $1\times10^{-2}$ ohm·cm²/(sec/100 cc), wherein the air permeability (JIS P8117) is represented by X sec/100 cc, and the membrane resistance upon impregnating the polyolefin microporous membrane with an electrolytic solution is represented by Y ohm·cm².

12 Claims, No Drawings

POLYOLEFIN MICROPOROUS MEMBRANE BASE FOR NONAQUEOUS SECONDARY BATTERY SEPARATOR, METHOD FOR PRODUCING THE SAME, NONAQUEOUS SECONDARY BATTERY SEPARATOR AND NONAQUEOUS SECONDARY BATTERY

TECHNICAL FIELD

The present invention relates to a polyolefin microporous membrane base for a nonaqueous secondary battery separator, a method for producing the same, a nonaqueous secondary battery separator, and a nonaqueous secondary battery.

BACKGROUND ART

A nonaqueous secondary battery, which is represented by a lithium ion secondary battery, has a high energy density and is widely used as a main electric power source of a portable electronic equipment, such as a portable phone and a notebook computer. The lithium ion secondary battery is demanded to attain a further high energy density, but has a technical issue on assuring safety.

A separator plays an important role on assuring safety of a lithium ion secondary battery, and under the current situation, a polyolefin microporous membrane, particularly a polyethylene microporous membrane, is used since it has a high strength and a shutdown function. The shutdown function referred herein means a function of shutting down an electric current by closing the pores of the microporous membrane when the temperature of the battery is increased, and the battery's generating heat is suppressed by the function, thereby preventing the battery from suffering thermal runaway.

The energy density of the lithium ion secondary battery is being increased year by year, and for assuring safety, heat resistance is demanded in addition to the shutdown function. However, the shutdown function contradicts the heat resistance since the operation mechanism thereof depends on closure of the pores through melting of polyethylene. There have been proposals on improvement in heat resistance with the molecular weight of polyethylene, the crystalline structure or the like, but sufficient heat resistance has not yet been attained. Such techniques have been proposed that polypropylene is blended or laminated, but under the current situation, these systems fail to attain sufficient heat resistance.

Separately, Patent Documents 1 and 2 and the like propose a separator having a porous layer formed of a polymer having sufficient heat resistance and a polyethylene microporous membrane laminated on each other for attaining both heat resistance and shutdown function. The structures of the heat resistant porous layer in these systems are roughly classified into two modes. In one mode, nonwoven fabrics formed of a heat resistant polymer or paper are laminated, and the techniques therefor are specifically disclosed in Patent Documents 1 and 2. In the other mode, porous layers formed of a heat resistant polymer are laminated by a wet coagulation method, and the techniques therefor are specifically disclosed in Patent Documents 3 to 14.

Patent Document 1 is an article obtained by laminating a polyphenylene sulfide nonwoven fabric and a polyethylene microporous membrane, and Patent Document 2 is an article obtained by laminating aramid paper and a polyethylene microporous membrane. The systems obtained by laminating a nonwoven fabric or paper with a polyethylene microporous membrane have an effect of preventing short circuit at a high temperature, but are difficult to maintain the shutdown state (the state where the separator has large resistance) owing to the large pore diameter of the heat resistant porous layer. This is because the polyethylene microporous membrane is locally melted down in the pores of the heat resistant porous layer, and in view of the standpoint, it cannot be said that they have sufficient heat resistance. Furthermore, they are difficult to have a decreased thickness with the current techniques since the nonwoven fabric and the paper are constituted by fibers, and are difficult to be applied to a nonaqueous secondary battery separator.

Patent Documents 3 to 14 are examples that disclose techniques of forming a heat resistant porous layer on a polyethylene microporous membrane by a wet coagulation method. In these techniques, a polyethylene microporous membrane, which is used in the current lithium ion secondary batteries, is generally used as a base, but when the heat resistant porous layer is formed on the polyethylene microporous membrane by the wet coagulation method for imparting sufficient heat resistance, such problems may occur that the shutdown characteristics are lowered (e.g., the shutdown temperature is shifted to a high temperature, and the resistance upon shutdown is lowered), and the membrane resistance of the separator is considerably increased to deteriorate the rate characteristics.

The major factor of the problems occurring is that a coating liquid used for forming the heat resistant porous layer intrudes into the pores of the base, as disclosed in Patent Document 15. Specifically, it is considered that the coating liquid used for forming the heat resistant porous layer intrudes into the pores on the surface side of the base, whereby the shutdown function, which works by closure of the pores of the base as the principle, is impaired, and the base is clogged at the interface to the heat resistant porous layer to increase the membrane resistance of the separator. Patent Document 15 discloses such a technique that a base is impregnated with a solvent in advance before forming a porous structure by the wet coagulation method with the coating liquid, thereby preventing the pores of the base from being clogged, but the method is not preferred due to the complicated operation. Furthermore, it cannot be said from the examples thereof that good shutdown characteristics are obtained.

Patent Document 16 discloses a structure that is free of the aforementioned clogging. What is disclosed is a structure of a separator obtained by simply laminating a low temperature contracting microporous membrane (i.e., a layer having a shutdown function) and a high temperature contracting microporous membrane (i.e., a heat resistant layer) without adhesion. The structure is obtained by simple lamination of two kinds of separators each having separated functions, and thus has no adhesion interface between the two kinds of separators. Accordingly, it is considered that a good shutdown function can be attained, and the resistance can be suitably lowered. However, it is necessary to handle two sheets of separators simultaneously upon producing a battery, which brings about a problem of complicated operation upon producing the battery. Furthermore, the separators each having separated functions are not adhered to each other, and the low temperature contracting porous membrane is melted down (broken) at a high temperature. Because of the high temperature contracting porous membrane, it is considered that the short circuit between the positive and negative electrodes can be avoided by making the strength of the membrane suitable, but there is a problem of failing to maintain the shutdown state.

Patent Document 1: JP-A-2000-108249
Patent Document 2: JP-A-2006-054127

Patent Document 3: JP-A-2000-100408
Patent Document 4: JP-A-2001-023600
Patent Document 5: JP-A-2001-266949
Patent Document 6: JP-A-2002-190291
Patent Document 7: JP-A-2003-040999
Patent Document 8: JP-A-2004-349146
Patent Document 9: JP-A-2002-355938
Patent Document 10: JP-A-2005-209570
Patent Document 11: JP-A-2006-027024
Patent Document 12: JP-A-2006-289657
Patent Document 13: JP-A-2006-307193
Patent Document 14: JP-A-2006-273987
Patent Document 15: JP-A-2001-023602
Patent Document 16: JP-A-2003-059477

DISCLOSURE OF THE INVENTION

Problems to be Solved by the Invention

Various systems have been proposed as a structure of a separator that attains both heat resistance and shutdown, as described above. In consideration of handling property, it is preferred that the contradicting functions are attained by substantially one sheet of a separator, and it is considered that such a method is most preferred that a heat resistant porous layer is formed on a polyolefin microporous membrane by a wet coagulation method, from the standpoint of controlling the thickness arbitrarily. However, the system always has a problem of lowering the shutdown function or having an increased membrane resistance, and it is difficult by the current technical level to provide a practical product. Accordingly, an object of the invention is to solve the problems.

Means for Solving the Problems

In the aforementioned conventional techniques, a heat resistant porous layer is coated on a polyolefin microporous membrane used in the current lithium ion secondary battery, and there is substantially no proposal of a technique that focuses on the particular structure of the base. The inventors have made detailed researches on a separator having a polyolefin microporous membrane coated with a heat resistant porous layer, and thus it has been found that in the separator, the properties of the polyolefin microporous membrane as the base are significantly important. It has also been found that the problems can be solved by applying a polyolefin microporous membrane that has a particular constitution, and thus the invention has been completed. The substance of the invention includes the following.

(1) A polyolefin microporous membrane base used for a nonaqueous secondary battery separator containing the polyolefin microporous membrane base at least one surface of which is coated and integrated with a heat resistant porous layer, characterized in that the membrane base has (A) a thickness of 5 to 20 μm, (B) a porosity of 35 to 50%, (C) an air permeability per unit thickness (JIS P8117) of 10 to 30 sec/100 cc·μm and a total air permeability of the membrane (JIS P8117) of 400 sec/100 cc or less, and (D) Y/X of $1\times10^{-3}$ to $1\times10^{-2}$ ohm·cm$^2$/(sec/100 cc), wherein the air permeability (JIS P8117) is represented by X sec/100 cc, and the membrane resistance upon impregnating the polyolefin microporous membrane with an electrolytic solution is represented by Y ohm·cm$^2$.

(2) The polyolefin microporous membrane base used for a nonaqueous secondary battery separator according to the item (1), characterized in that the membrane base has a heat contraction ratio at 105° C. in one of MD and TD of 20 to 40%.

(3) The polyolefin microporous membrane base used for a nonaqueous secondary battery separator according to the item (1) or (2), characterized in that the membrane base has a piercing strength of 300 g or more.

(4) The polyolefin microporous membrane base used for a nonaqueous secondary battery separator according to one of the items (1) to (3), characterized in that the polyolefin is polyethylene.

(5) A method for producing the polyolefin microporous membrane base used for a nonaqueous secondary battery separator according to one of the items (1) to (4), characterized by preparing a solution containing 1 to 35% by weight of a polyolefin composition containing mainly polyolefin dissolved in a mixed solvent containing a solvent (A) having a boiling point of 200° C. or more at atmospheric pressure and a solvent (B) having a boiling point of less than 200° C. at atmospheric pressure; extruding the solution from a die at a temperature that is equal to or higher than a melting point of the polyolefin composition and is equal to or lower than the melting point+60° C.; cooling the solution to form a gel composition; removing the solvent (B) from the gel composition; stretching the gel composition; removing the solvent (A) from the composition; and annealing the composition.

(6) The method for producing the polyolefin microporous membrane base used for a nonaqueous secondary battery separator according to the item (5), characterized in that the solvent (A) is used in an amount of 50 parts or more by weight per 100 parts by weight of the polyolefin composition.

(7) The method for producing the polyolefin microporous membrane base used for a nonaqueous secondary battery separator according to the item (5) or (6), characterized in that the polyolefin is polyethylene.

(8) The method for producing the polyolefin microporous membrane base used for a nonaqueous secondary battery separator according to one of the items (5) to (7), characterized in that the solvent (A) is at least one selected from the group consisting of paraffin, a paraffin oil, a mineral oil, a castor oil, tetralin, ethylene glycol and glycerin.

(9) The method for producing the polyolefin microporous membrane base used for a nonaqueous secondary battery separator according to one of the items (5) to (8), characterized in that the solvent (B) is at least one selected from the group consisting of decalin, toluene, xylene, an alkane having 9 to 11 carbon atoms, diethyltriamine, ethyldiamine, dimethylsulfoxide and hexane.

(10) The method for producing the polyolefin microporous membrane base used for a nonaqueous secondary battery separator according to one of the items (5) to (9), characterized in that a temperature for annealing is 100 to 125° C.

(11) A nonaqueous secondary battery separator characterized by containing the polyolefin microporous membrane base for a nonaqueous secondary battery separator according to one of the items (1) to (4), and a heat resistant porous layer formed on at least one surface of the base and made of a heat resistant resin having a melting point of 200° C. or more.

(12) The nonaqueous secondary battery separator according to the item (11), characterized in that the heat resistant resin is at least one selected from the group consisting of wholly aromatic polyamide, polyimide, polyamideimide, polysulfone, polyketone, polyetherketone, polyetherimide and cellulose.

(13) The nonaqueous secondary battery separator according to the item (12), characterized in that the heat resistant resin is meta-type aromatic polyamide.

(14) The nonaqueous secondary battery separator according to one of the items (11) to (13), characterized in that the heat resistant porous layer contains an inorganic filler.

(15) The nonaqueous secondary battery separator according to the item (14), characterized in that the inorganic filler is at least one selected from the group consisting of a metallic oxide, a metallic nitride, a metallic carbide, a metallic hydroxide, a carbonate salt and a sulfate salt.

(16) The nonaqueous secondary battery separator according to the item (15), characterized in that the inorganic filler is alumina.

(17) The nonaqueous secondary battery separator according to one of items (11) to (16), characterized in that the heat resistant porous layer is formed by: providing a coating liquid by dissolving the heat resistant resin in a solvent; coating the coating liquid on at least one surface of the polyolefin microporous membrane base; and integrating the coating liquid to the polyolefin microporous membrane base by coagulating, rinsing with water, and drying.

(18) The nonaqueous secondary battery separator according to the item (17), characterized in that the coating liquid is a slurry having an inorganic filler dispersed therein.

(19) A nonaqueous secondary battery containing a positive electrode, a negative electrode, a separator provided between the electrodes, and a nonaqueous electrolytic solution, characterized in that the separator is the nonaqueous secondary battery separator according to one of items (11) to (18).

ADVANTAGES OF THE INVENTION

In a nonaqueous secondary battery separator having a polyolefin microporous membrane base having on the surface thereof a heat resistant porous layer formed by the wet coagulation method, the constitution of the polyolefin microporous membrane base of the invention is effective for decreasing the resistance while maintaining the heat resistance and the shutdown function. The major factor of the advantages obtained is that the interface between the heat resistant porous layer and the polyolefin microporous membrane base can be controlled to make these properties favorable, and therefore, it is particularly effective for such constitution that the heat resistant porous layers are formed on both surfaces of the polyolefin microporous membrane base to provide two interfaces between the polyolefin microporous membrane base and the heat resistant porous layers.

BEST MODE FOR CARRYING OUT THE INVENTION

Polyolefin Microporous Membrane Base for Nonaqueous Secondary Battery Separator

The polyolefin microporous membrane base for a nonaqueous secondary battery separator of the invention (which may be arbitrarily referred to as a polyolefin microporous membrane base) is favorably used as a nonaqueous secondary battery separator by providing on at least one surface thereof a heat resistant porous layer coated thereon and integrated therewith. The polyolefin microporous membrane base is characterized by having the following constitutional elements (A) to (D).

(A) The thickness is 5 to 20 μm.
(B) The porosity is 35 to 50%.
(C) The air permeability per unit thickness (JIS P8117) is 10 to 30 sec/100 cc·μm and the total air permeability of the membrane (JIS P8117) is 400 sec/100 cc or less.

(D) Y/X is $1 \times 10^{-3}$ to $1 \times 10^{-2}$ ohm·cm$^2$/(sec/100 cc), preferably $3 \times 10^{-3}$ to $1 \times 10^{-2}$ ohm·cm$^2$/(sec/100 cc), and more preferably $5 \times 10^{-3}$ to $1 \times 10^{-2}$ ohm·cm$^2$/(sec/100 cc), wherein the air permeability (JIS P8117) is represented by X sec/100 cc, and the membrane resistance upon impregnating the polyolefin microporous membrane base with an electrolytic solution is represented by Y ohm·cm$^2$.

The air permeability X in the constitutional elements (C) and (D) is given by the following expression (1).

$$X = K(\tau^2 \cdot L)/(\epsilon \cdot d) \tag{1}$$

wherein K represents the proportionality constant derived from measurement, τ represents the tortuosity, L represents the thickness, ε represents the porosity, and d represents the average pore diameter. The membrane resistance Y is given by the following expression (2).

$$Y = \rho \tau^2 \cdot L/\epsilon \tag{2}$$

wherein ρ represents the specific resistance of the electrolytic solution, with which the separator is impregnated. According to the expressions (1) and (2), Y/X is given by the following expression (3).

$$Y/X = (\rho/K) \cdot d \tag{3}$$

Accordingly, Y/X is a parameter that is proportional to the pore diameter d of the polyolefin microporous membrane. The range of Y/X in the invention is obtained by measuring the membrane resistance Y at 20° C. by using an electrolytic solution obtained by dissolving LiBF$_4$ in a concentration of 1 M in a solvent containing propylene carbonate and ethylene carbonate mixed at a weight ratio of 1/1. This means the favorable range of the pore diameter d of the polyolefin microporous membrane. A conventional polyolefin microporous membrane as a ordinary lithium ion secondary battery separator has Y/X in a range of $1 \times 10^{-2}$ to $1 \times 10^{-1}$ ohm·cm$^2$/(sec/100 cc), and the polyolefin microporous membrane base of the invention has a small pore diameter as compared thereto.

The specific resistance ρ of the electrolytic solution at 20° C. is $2.66 \times 10^2$ ohm·cm, and K is 0.0778 sec/100 cc. Accordingly, ρ/K is $3.4 \times 10^3$ ohm·cm/(sec/100 cc). Consequently, the average pore diameter d is calculated to be 3.0 to 30 nm, preferably 10 to 30 nm, and more preferably 15 to 30 nm.

As the ordinary method for measuring a pore diameter of a polyolefin microporous membrane base, a mercury porosimeter method, a perm porosimeter method and the like have been employed. In the mercury porosimeter method, however, deformation upon injecting mercury exerts harmful influence, and when the pore diameter of the microporous membrane is smaller, it is difficult to measure adequately the pore diameter of the polyolefin microporous membrane base by the method. In the perm porosimeter method, the narrowest necked part of an arbitrary pore is determined as the pore diameter, and thus it is also difficult to measure adequately the pore diameter of the polyolefin microporous membrane base by the method. However, in the method in the invention, in which the pore diameter d is calculated from the ratio between the membrane resistance Y and the air permeability X, the pores of the polyolefin microporous membrane base are not deformed upon measuring, and the actual average pore diameter d can be evaluated rightly, thereby comprehending the properties as a battery separator adequately. The inventors have focused attention on the parameter because of the reasons, and have investigated the parameter, and as a result, it has been found that a polyolefin microporous membrane that has Y/X of $1 \times 10^{-3}$ to $1 \times 10^{-2}$ ohm·cm$^2$/(sec/100 cc) is favorably used as a base of a nonaqueous secondary battery separator having a heat resistant porous layer coated thereon.

The polyolefin microporous membrane base of the invention is also characterized by having a porosity of 35 to 50%. The membrane resistance of the polyolefin microporous membrane base is proportional to the porosity as understood from the expression 2, and the porosity is preferably as large as possible since the membrane resistance becomes smaller. The porosity of a polyolefin microporous membrane as an ordinary lithium ion secondary battery separator is defined approximately to a range of 30 to 50%, and the parameter Y/X, which is proportional to the pore diameter, is in a range of $1\times10^{-2}$ to $1\times10^{-1}$ ohm·cm$^2$/(sec/100 cc). In the range, Y/X and the porosity have positive correlation, i.e., the pore diameter becomes larger when the porosity becomes larger. For example, a porosity of approximately 50% provides Y/X of $1\times10^{-2}$ ohm·cm$^2$/(sec/100 cc), and a porosity of approximately 30% provides Y/X of $1\times10^{-2}$ ohm·cm$^2$/(sec/100 cc). In the case where Y/X is in a range of $1\times10^{-3}$ to $1\times10^{-2}$ ohm·cm$^2$/(sec/100 cc) as in the invention, Y/X and the porosity have less correlation in a range of the porosity of 35 to 50%. Accordingly, it is apparent that the polyolefin microporous membrane base of the invention has a constitution that is different from a conventional polyolefin microporous membrane as a lithium ion secondary battery separator, and thus is favorably used as a base for a nonaqueous secondary battery separator having a heat resistant porous layer coated thereon. In brief, the polyolefin microporous membrane base of the invention has a smaller pore diameter and an equivalent porosity as compared to a conventional polyolefin microporous membrane as a lithium ion secondary battery separator.

The porosity is a major fluctuating factor of the membrane resistance as understood from the expression 2, and in consideration of application to a separator for a lithium ion secondary battery, the porosity is preferably in a range of 35 to 50%. When the porosity is less than 35%, the separator is unfavorably increased in membrane resistance to deteriorate the discharging characteristics and the charging characteristics of the battery. A polyolefin microporous membrane having a porosity exceeding 50% is difficult to have a parameter Y/X, which depends on the pore diameter, within the range of the invention. This is because in general a pore diameter is necessarily larger for providing a larger porosity. A porosity exceeding 50% is not preferred from the standpoint of mechanical properties since the tensile strength and the piercing strength are lowered. Furthermore, favorable shutdown characteristics may not be obtained.

Even though the porosity is in a range of 35 to 50%, when Y/X is larger than $1\times10^{-2}$ ohm·cm$^2$/(sec/100 cc), i.e., the pore diameter is larger, such unfavorable influences occur in the shutdown characteristics that the shutdown temperature is shifted to high temperatures, and the resistance upon shutdown is decreased. Furthermore, upon coating the heat resistant porous layer, the resistance of the separator is unfavorably increased significantly. It is considered that these defects occur since the interface between the polyolefin microporous membrane base and the heat resistant porous layer is not favorably formed due to such reasons as that the heat resistant porous layer intrudes into the pores of the polyolefin microporous membrane with a too large pore diameter to cause clogging. In the case where Y/X is smaller than $1\times10^{-3}$ ohm·cm$^2$/(sec/100 cc), such a defect occurs that the electrolytic solution is difficult to permeate the pores of the polyolefin microporous membrane.

The thickness of the polyolefin microporous membrane base of the invention is preferably 5 to 20 µm, and particularly preferably 10 to 15 µm. When the thickness is smaller than 5 µm, it is difficult to obtain sufficient tensile properties and piercing strength, and the base is difficult to be applied to a nonaqueous secondary battery separator base. When the thickness exceeds 20 µm, a nonaqueous secondary battery separator using the base has a thickness that is larger than a conventional polyolefin microporous membrane as a separator, and thus the energy density of the battery is unfavorably decreased.

The air permeability (JIS P8117) of the polyolefin microporous membrane base of the invention is preferably 400 sec/100 cc or less for the total membrane and is preferably 10 to 30 sec/100 cc·µm per unit thickness. In the case where the polyolefin microporous membrane of the invention has an air permeability that exceeds 400 sec/100 cc for the total membrane or that exceeds 30 sec/100 cc·µm per unit thickness, the membrane resistance of the separator is increased to provide problems of failing to provide favorable discharging characteristics and charging characteristics. There is substantially no such case with the constitution of the polyolefin microporous membrane base of the invention that the air permeability is lower than 10 sec/100 cc·µm per unit thickness.

The polyolefin microporous membrane base of the invention preferably has a piercing strength of 300 g or more. When the piercing strength is less than 300 g, the base is insufficient in strength for preventing short circuit between the positive and negative electrodes, which provides such problems as insufficient production yield.

The polyolefin microporous membrane base of the invention preferably has a heat contraction ratio at 105° C. in one of MD and TD of 20 to 40%. Since the polyolefin microporous membrane base of the invention is such a base that assumes the heat resistant porous layer coated thereon, it is unnecessary to suppress the heat contraction ratio significantly, unlike the case for a polyolefin microporous membrane for an ordinary lithium ion secondary battery separator. This is because the heat contraction ratio can be sufficiently suppressed by coating the heat resistant porous layer. Even though the factor is taken into consideration, it is not preferred that the heat contraction ratio exceeds 40% in MD or TD since the coated separator suffers a problem in heat contraction.

The heat contraction ratio at 105° C. in one of MD and TD is preferably 20% or more owing to the following factors. One of the factors is that the shutdown characteristics are improved. In the case where the base is coated with the heat resistant porous layer, closing of the pores of the polyolefin microporous membrane are suppressed by restraining by the layer. This is a factor of causing such phenomena as the high temperature shift of the shutdown characteristics and the decrease of the resistance upon shutdown. A polyolefin microporous membrane for an ordinary lithium ion secondary battery separator is controlled by an annealing process or the like to have a heat contraction ratio at 105° C. in both MD and TD of 10% or less. Upon applying the polyolefin microporous membrane to a separator coated with the heat resistant porous layer, considerable harmful influences occurs on the shutdown characteristics due to the aforementioned factors. The base of the invention having a high contraction ratio is preferably used since favorable shutdown characteristics can be obtained with sufficient closure of the pores even though the heat resistant porous layer is coated thereon.

Another one of the factors is that the productivity is improved. The process for suppressing heat contraction, such as an annealing process, is complicated and is one of the factors that deteriorate the productivity. Since the polyolefin microporous membrane base of the invention is unnecessary to be suppressed significantly in heat contraction, whereby the annealing process and the like can be drastically simplified, which is advantageous in productivity as compared to the conventional products.

The polyolefin composition that is applied to the polyolefin microporous membrane base of the invention may be any composition that contains mainly polyolefin, and examples thereof include compositions containing polyethylene, polypropylene, polymethylpentene and combinations thereof. In particular, a composition containing high density polyethylene and a composition containing a mixture of high density polyethylene and ultrahigh molecular weight polyethylene are preferred. The molecular weight of the polyethylene is preferably 500,000 to 5,000,000 in terms of weight average molecular weight, and a composition containing ultrahigh molecular weight polyethylene having a weight average molecular weight of 1,000,000 or more in an amount of 1% by weight or more is particularly preferred. A polyethylene composition containing ultrahigh molecular weight polyethylene having a weight average molecular weight of 1,000,000 or more in an amount of 10 to 90% by weight is preferred. The composition may properly contain low molecular weight polyolefin wax, an oligomer, a polyethylene copolymer obtained by copolymerizing $\alpha$-polyolefin and the like, and polypropylene in such a range that the aforementioned properties are satisfied. In particular, it is preferred that low molecular weight polyolefin wax, an oligomer, an $\alpha$-polyolefin copolymer and the like are properly mixed since the shutdown temperature of the base itself is considerably lowered.

Method for Producing Polyolefin Microporous Membrane Base

The polyolefin microporous membrane base of the invention can be produced by preparing a solution containing 1 to 35% by weight of a polyolefin composition containing mainly polyolefin dissolved in a mixed solvent containing a solvent (A) having a boiling point of 200° C. or more at atmospheric pressure and a solvent (B) having a boiling point of less than 200° C. at atmospheric pressure; extruding the solution from a die at a temperature that is equal to or higher than a melting point of the polyolefin composition and is equal to or lower than the melting point+60° C.; cooling the solution to form a gel composition; removing the solvent (B) from the gel composition; stretching the gel composition; removing the solvent (A) from the composition; and annealing the composition.

While the polyolefin composition has been described above, the melting point thereof is preferably 110 to 150° C., and a polyethylene composition is particularly preferred.

A polyolefin solution is prepared with the polyolefin composition and a mixed solvent. The concentration of the polyolefin solution is preferably 1 to 35% by weight, and more preferably from 10 to 30% by weight. When the concentration of the polyolefin solution is less than 1% by weight, a gel composition obtained by cooling for gelling is highly swollen with the solvent and liable to deform, and may suffer problems in handleability in some cases. When it is 35% by weight or more, on the other hand, the discharging amount may be lowered due to the increased pressure upon extruding, thereby failing to improve the productivity in some cases. Furthermore, orientation may proceed in the extruding process to fail to assure stretching property and homogeneity in some cases.

The solvent (A) is preferably used in an amount of 50 parts by weight or more, and more preferably 100 parts by weight or more, per 100 parts by weight of the polyolefin composition. When the amount of the solvent (A) is less than 50 parts by weight per 100 parts by weight of the polyolefin composition, such a problem may occur that the pores formed have too large a size, whereby it is difficult to provide the polyolefin microporous membrane base of the invention.

The mixing ratio of the solvent (A) and the solvent (B) is 5 to 95% by weight for the solvent (A) and 5 to 95% by weight for the solvent (B), and preferably 10 to 60% by weight for the solvent (A) and 40 to 90% by weight for the solvent (B).

The solvent (A) preferably has a boiling point of 200° C. or more, the solvent (B) preferably has a boiling point of less than 200° C., and the difference in boiling point between the solvent (A) and the solvent (B) is preferably 15° C. or more, more preferably 25° C. or more, and further preferably 35° C. or more. When the boiling point of the solvent (B) is 200° C. or more, the solvent (B) is difficult to be removed properly in the process of drying the gel formed article after forming, thereby making difficult to provide a polyolefin microporous membrane base that has the properties characteristic in the invention. When the boiling point of the solvent (A) is less than 200° C., the solvent (A) is also removed improperly in the drying process. The important point for providing the polyolefin microporous membrane base of the invention is that only the solvent (B) is properly removed in the drying process, and thus the boiling points of the solvent (A) and the solvent (B) are preferably distant from each other to some extent within the proper range.

The solvent (A) and the solvent (B) are so selected that the solvent (A) and the solvent (B) are miscible in each other at the temperature, at which the polyolefin solution is produced and processed, thereby producing a homogeneous solution.

The solvent (A) is not particularly limited as far as it has a boiling point of 200° C. or more at atmospheric pressure and can sufficiently dissolve the polyolefin composition. Preferred examples of the solvent (A) include paraffin having 17 or more carbon atoms (>300° C.), a paraffin oil (230 to 300° C.), a mineral oil (<300° C.), a castor oil (200° C.), tetralin (206° C.), ethylene glycol (>300° C.) and glycerin (290° C.), wherein the boiling points thereof at atmospheric pressure are shown in parenthesis. Among these, paraffin having 17 or more carbon atoms is particularly preferred.

The solvent (B) is not particularly limited as far as it has a boiling point of less than 200° C. at atmospheric pressure and can sufficiently dissolve the polyolefin composition. Preferred examples of the solvent (B) include toluene (110° C.), xylene (138 to 144° C.), an alkane having 9 to 11 carbon atoms (151 to 196° C.), decalin (187 to 196° C.), hexane (69° C.), diethyltriamine (107° C.), ethyldiamine (116° C.) and dimethylsulfoxide (189° C.), wherein the boiling points thereof at atmospheric pressure are shown in parenthesis. Among these, decalin is particularly preferred.

It is preferred that the polyolefin solution (suspension liquid) is kneaded with a single screw extruder, and preferably with a double screw extruder, and the fluid increased in viscosity is extruded from a T die or an I die at a temperature that is equal to or higher than the melting point of the polyolefin composition and is equal to or lower than the melting point+60° C., and is cooled quickly to the gelling temperature or lower to form gel by passing a chill roll or a cooling bath. When the temperature, at which the polyolefin solution is extruded, is less than the melting point, the solution is difficult to be extruded due to the increased viscosity, and homogeneity is difficult to be assured due to gel formed locally. When the extruding temperature of the polyolefin solution exceeds the melting point+60° C., the solvent (B) may be unfavorably foamed to form bubbles contained in the gel article.

The solvent (B) is then removed from the gel formed article. Examples of the solvent removing process include a method of removing the solvent by evaporating through heating or the like. After removing the solvent (B), the amount of the solvent contained in the gel formed article is preferably 10 to 80% by weight with respect to the amount of the solvent (B) contained in the slurry.

The heating temperature, at which the solvent (B) is removed by heating, is preferably from 50 to 100° C., and more preferably from 70 to 90° C. According to the procedure, the solvent (B) is substantially removed from the gel formed article.

The amount of the solvent (A) in the gel formed article is preferably 5 to 95% by weight. When it is less than 5% by weight, the pore diameter of the fine pores formed in the stretched formed article unfavorably becomes large to deviate from the range of the invention. When it exceeds 95% by weight, there is unfavorably a problem in handleability, such as ooze of a large amount of solvent upon stretching.

After removing the solvent (B), a stretching process is performed. In the stretching process, the gel formed article is heated and biaxially stretched to a prescribed ratio by an ordinary method, such as a tenter method, a roll method and a rolling method, or a combination of the methods. The biaxial stretching may be either a simultaneous method or a sequential method. Furthermore, longitudinally multi-stage stretching, and three-step or four-step stretching may be employed.

The stretching temperature is preferably 90° C. or more and less than the melting point of the polyolefin composition, and more preferably 100 to 120° C. In the case where the stretching temperature is melting point of the polyolefin composition or more, the gel formed article cannot be stretched since the article is melted. In the case where the stretching temperature is less than 90° C., the gel formed article may be difficult to be stretched at a large ratio since the article is liable to be broken due to insufficient softening in some cases.

The stretching ratio may be at least 2 times, and preferably 4 to 20 times, in one direction while it varies depending on the thickness of the gel formed article.

The microporous membrane after stretching is immersed in an extraction solvent for extracting the solvent (A). Examples of the extraction solvent used include volatile solvents, for example, a hydrocarbon, such as benzene, hexane, heptane, cyclohexane, decalin and tetralin, a chlorinated hydrocarbon, such as methylene chloride, carbon tetrachloride and methylene chloride, a fluorinated hydrocarbon, such as ethane trifluoride, and an ether compound, such as diethyl ether and dioxane. The solvents may be appropriately selected depending on the solvent used for dissolving the polyolefin composition, and can be used solely or after mixing. The solvent in the polyolefin microporous membrane is removed to less than 1% by weight by extraction of the solvent.

Thereafter, the article is properly subjected to an annealing process. The resulting polyolefin microporous membrane base can be controlled in air permeability, pore diameter, porosity and heat contraction behavior by the annealing process. The processing conditions may be so determined that the polyolefin microporous membrane base of the invention is obtained. From the standpoint, the annealing temperature is preferably, for example, 100 to 125° C. for a polyethylene microporous membrane base. When the annealing temperature is less than 100° C., such a behavior may be confirmed that the polyethylene microporous membrane base is considerably contracted at room temperature when the base becomes free of tension, and the base is difficult to be handled in the cases. When the annealing temperature exceeds 125° C., such problems may unfavorably occur that the heat contraction is too suppressed, the porosity is lowered, the pore diameter becomes too small, and the pores are clogged to increase the membrane resistance considerably.

Battery Separator

The nonaqueous secondary battery separator of the invention is characterized by containing the polyolefin microporous membrane base and a heat resistant porous layer formed on at least one surface of the base and made of a heat resistant resin having a melting point of 200° C. or more.

The melting point of the heat resistant resin can be determined by such measures as differential scanning calorimetry (DSC) and differential thermal analysis (DTA). A resin that substantially does not have a melting point determined by the aforementioned measures due to the decomposition temperature lower than the melting point can be considered as having a melting point of 200° C. or more in the case where the decomposition temperature thereof is 200° C. or more, and thus the resin is included in the heat resistant resin in the invention. The molecular weight of the heat resistant resin is not particularly limited as far as it is in such a range that the porous layer can be formed.

Preferred examples of the heat resistant resin include at least one selected from the group consisting of wholly aromatic polyamide, polyimide, polyamideimide, polysulfone, polyketone, polyetherketone, polyetherimide and cellulose, and meta-type wholly aromatic polyamide is particularly preferred since a favorable porous layer is formed by a wet coagulation method. Preferred examples of the meta-type wholly aromatic polyamide include poly-m-phenylene isophthalamide.

In a more preferred embodiment, the heat resistant porous layer contains an inorganic filler. By adding an inorganic filler property, the shutdown characteristics can be improved, the heat contraction ratio in a high temperature region exceeding the melting point of the polyolefin composition can be suppressed, the membrane resistance can be decreased, and the friction coefficient can be decreased. The material, the particle diameter and the amount of the inorganic filler added cannot be determined unconditionally since they vary depending on advantages to be obtained, and preferred examples of the inorganic filler include a metallic oxide, such as alumina, zirconia, yttria, ceria, magnesia, titania and silica, a metallic carbide, such as aluminum carbide, titanium carbide and tungsten carbide, a metallic nitride, such as boron nitride and aluminum nitride, a salt, such as calcium carbonate and barium sulfate, and a metallic hydroxide, such as aluminum hydroxide and magnesium hydroxide. Among these, alumina is particularly preferred.

The particle diameter of the inorganic filler is preferably 0.01 to 1.00 μm in terms of average particle diameter. When the average particle diameter is less than 0.01 μm, the heat resistant porous layer is difficult to be formed since the viscosity of the coating slurry is too large, and the heat resistant porous layer becomes brittle. When it is larger than 1.00 μm, the coated layer unfavorably cannot be made thin. The average particle diameter is more preferably 0.50 to 1.00 μm, and when the average particle diameter is in the range, the advantages obtained by adding the inorganic filler can be assured at high levels.

The amount of the inorganic filler added is particularly preferably 50 to 75% by volume with respect to the total volume of the heat resistant resin and the inorganic filler in the heat resistant porous layer. Within the range, the advantages obtained by adding the inorganic filler can be assured at high levels. Accordingly, heat contraction at a high temperature can be highly suppressed, the shutdown function can be enhanced, and furthermore the friction coefficient can be decreased to provide a separator improved in handling.

The nonaqueous secondary battery separator of the invention is characterized in that the heat resistant porous layer is formed on at least one surface of the polyolefin microporous membrane base, and in a particularly preferred embodiment, the heat resistant porous layers are formed on both surfaces of the polyolefin microporous membrane base. In the case where the heat resistant porous layer is formed only on one surface of the polyolefin microporous membrane base, a problem may occur in handleability due to curling. In the case where the heat resistant porous layers are formed on both surfaces of the polyolefin microporous membrane base, the separator is favorably improved not only in handleability but also in durability.

The thickness of the nonaqueous secondary battery separator of the invention is preferably 10 to 25 µm, and particularly preferably 10 to 20 µm. When the thickness exceeds 25 µm, a problem occurs in practical utility from the standpoint of energy density, and when it is less than 10 µm, the strength becomes insufficient to deteriorate the function inherent to a separator, i.e., short circuit between the positive and negative electrode is prevented. For providing the nonaqueous secondary battery separator having a thickness within the range, the thickness of the heat resistant porous layer is preferably 2 to 10 µm, and particularly preferably 4 to 8 µm. In the case where the heat resistant porous layers are formed on both surfaces of the polyolefin microporous membrane base, the total thickness of the heat resistant porous layers formed on the front and back surfaces is determined as the thickness of the heat resistant porous layer. When the thickness of the heat resistant porous layer is less than 2 µm, sufficient heat resistance is unfavorably difficult to be assured.

The porosity of the nonaqueous secondary battery separator of the invention is preferably 30 to 80%, and particularly preferably 50 to 70%. When the porosity exceeds 80%, sufficient heat resistance is unfavorably difficult to be assured. When it is less than 30%, the membrane resistance becomes too high to assure sufficient discharging property.

The air permeability (JIS P8117) of the nonaqueous secondary battery separator of the invention is preferably 450 sec/100 cc or less, and particularly preferably 400 sec/100 cc or less. When the air permeability exceeds 450 sec/100 cc, the discharging property may be unfavorably impaired.

The difference in air permeability, which is defined as an absolute value of a value obtained by subtracting the air permeability (JIS P8117) of the polyolefin microporous membrane base from the air permeability (JIS P8117) of the separator of the invention, is preferably 150 sec/100 cc or less, and more preferably 100 sec/100 cc or less. The difference in air permeability is not only an index of the permeability of the heat resistant porous layer, but also an index of the extent of favorability of the interface between the polyolefin microporous membrane base and the heat resistant porous layer. When the value exceeds 150 sec/100 cc, there is a considerably high possibility that the interface does not have good permeability, and in this case, the interface unfavorably may become the rate-determining step of ion migration, thereby deteriorating the discharging property.

The nonaqueous secondary battery separator of the invention preferably has a membrane resistance of 1 to 5 ohm·cm$^2$. The membrane resistance herein is a value measured at 20° C. with an electrolytic solution obtained by dissolving $LiBF_4$ in a concentration of 1 M in a solvent containing propylene carbonate and ethylene carbonate mixed at a weight ratio of 1/1.

The weight per unit of the separator is determined by controlling the thickness and the porosity within the aforementioned ranges, and is preferably approximately 5 to 20 g/m$^2$. The weight per unit largely varies depending on the specific gravity of the constitutional materials, and the invention is not limited to the aforementioned range.

The heat contraction ratio of the separator is preferably 1 to 30%, and more preferably 1 to 20%, in both MD and TD. The heat contraction ratio herein is a ratio of decrease in dimension of a specimen when the specimen is subjected to a heat treatment at 175° C. without tension.

The separator having the aforementioned constitution can be favorably used as a separator for a nonaqueous secondary battery. In general, a nonaqueous secondary battery has such a constitution that a positive electrode and a negative electrode are coupled to each other through a separator, include electrolytic solution, and the assembly is encapsulated in an outer package.

Examples of the negative electrode include a lithium metallic foil and an electrode containing a collector having formed thereon a negative electrode active substance bound with a binder. Examples of the negative electrode active substance include carbon powder and fibers capable of occluding lithium, such as graphite and hard carbon, and aluminum, tin and silicon capable of forming an alloy with lithium. Examples of the binder include polyvinylidene fluoride and carboxymethyl cellulose. A copper foil is generally used as the collector.

An electrode containing a collector having formed thereon a positive electrode active substance bound with a binder is generally used as the positive electrode. Examples of the positive electrode active substance include lithium cobaltate, lithium nickelate, lithium manganate and lithium iron phosphate. Polyvinylidene fluoride is generally used as the binder, and an aluminum foil is generally used as the collector.

The electrolytic solution has such a constitution that a lithium salt is dissolved in a nonaqueous solvent. Examples of the lithium salt include $LiPF_6$, $LiBF_4$ and $LiClO_4$, and $LiPF_6$ is generally used under the current situation. A carbonate solvent is generally used as the nonaqueous solvent, and specific examples thereof include propylene carbonate, ethylene carbonate, dimethyl carbonate, diethyl carbonate, ethylmethyl carbonate and γ-butyrolactone, which may be used solely or after mixing.

Examples of the outer package include a stainless steel canister, an aluminum canister and an aluminum laminated film package. The shape of the battery may be a button shape, a cylinder shape, a rectangular shape or the like, to all of which the separator of the invention may be applied.

Method for Producing Nonaqueous Secondary Battery Separator

In the nonaqueous secondary battery separator of the invention, the heat resistant porous layer is formed by providing a coating liquid by dissolving the heat resistant resin in a solvent; coating the coating liquid on at least one surface of the polyolefin microporous membrane base; and integrating the coating liquid to the polyolefin microporous membrane base by coagulating, rinsing with water, and drying. In the case where the heat resistant porous layer is formed in this manner, the constitution of the polyolefin microporous membrane base is significantly important. The polyolefin microporous membrane base of the invention has a small pore diameter although it has a high porosity, as described above. The application of the base largely remedies the general problems associated with a battery separator containing a polyolefin microporous membrane having coated and formed thereon a heat resistant porous layer by a wet coagulation method, i.e., deterioration in shutdown characteristics and ion permeability. The advantages become conspicuous particularly when the heat resistant porous layers are coated on both surfaces.

The coating liquid may be formed by dissolving the heat resistant resin in a solvent. The solvent is suitably such a solvent that contains a combination of a good solvent capable of well dissolving the heat resistant resin and a solvent corresponding to a poor solvent to the heat resistant resin, and the selection of these solvents provides a micro-phase separation structure to form a favorable porous layer.

Examples of the good solvent include N-methylpyrrolidone, dimethylacetamide, dimethylformamide and dimethylsulfoxide. Preferred examples of the poor solvent include water, an alcohol, such as methanol and ethanol, a diol, such as butanediol and hexanediol, and a glycol, such as ethylene glycol, tripropylene glycol and polypropylene glycol. The mixing ratio of the good solvent and the poor solvent may be suitably selected depending on the combination of the solvents.

In the case where the inorganic filler is added to the heat resistant porous layer, a slurry containing the inorganic filler dispersed therein may be coated added to the coating solution.

The method for coating the coating liquid on the polyolefin microporous membrane base is preferably such a coating method as a knife coater, a die coater, a gravure coater, a Meyer bar coater and a reverse roll coater. In the case where the heat resistant porous layers are formed on both surfaces of the polyolefin microporous membrane base, it is preferred that the coating liquid is coated on both the front and back surfaces of the polyolefin microporous membrane base before coagulating the coating liquid, thereby enhancing the productivity. Preferred examples of the method for coating the coating liquid on both the surfaces of the polyolefin microporous membrane base include a method of passing the polyolefin microporous membrane base between two Meyer bars, reverse rolls or dies facing each other, thereby coating the coating liquid on both surfaces simultaneously.

The polyolefin microporous membrane base having the coating liquid coated thereon is coagulated, and the coagulation method is preferably a method of immersing the base in a coagulation liquid containing the solvents used in the coating liquid and water, from the standpoint of productivity. The composition of a coagulation bath is not particularly limited and may be suitably selected corresponding to the composition of the coating liquid, and in general, the ratio (solvents used in coating liquid)/(water) is preferably 20 to 60/80 to 40.

After completing coagulation, the base is rinsed with water to remove the coagulation liquid, and water is removed by drying to provide the nonaqueous secondary battery separator of the invention.

Example

Polyethylene Microporous Membrane Base

In the examples, the properties of the polyethylene microporous membrane base were measured in the following manners.

Thickness

The thickness was obtained by measuring 20 points per a specimen with a thickness meter of contact type (produced by Mitutoyo Corporation), and obtaining the average value of them. The contact probe used had a cylindrical shape with a diameter on the bottom surface of 0.5 cm, and the measurement was performed under the condition where a load of 1.2 $kg/m^2$ was applied to the contact probe.

Air Permeability

The air permeability (sec/100 cc) was measured according to JIS P8117. The air permeability per unit thickness was obtained by dividing the measured air permeability (sec/100 cc) by the thickness (μm).

Porosity

A polyethylene microporous membrane base was cut into a dimension of 10 cm×10 cm and measured for weight. The weight per unit ($g/m^2$) was obtained by dividing the weight by the area. The bulk density $d_1$ ($g/cm^3$) of the polyethylene microporous membrane base was obtained by dividing the weight per unit by the thickness. The porosity $\epsilon$ (%) was obtained by the expression $\epsilon=(1-d_1/d_0)\times100$ with $d_0$ being the true density of the polyethylene.

Membrane Resistance

A specimen was cut into a dimension of 2.6 cm×2.0 cm. The cut specimen was immersed in a methanol solution having 3% by weight of a nonionic surfactant (Emulgen 210P, produced by Kao Corporation) dissolved therein, followed by air drying. An aluminum foil having a thickness of 20 μm was cut into a dimension of 2.0 cm×1.4 cm, and was attached with a lead tab. Two pieces of the aluminum foil were prepared, and the cut separator was held with two pieces of the aluminum foil, which were prevented from forming short circuit. The separator was impregnated with an electrolytic solution, which was formed by dissolving $LiBF_4$ in a concentration of 1 M in a solvent containing propylene carbonate and ethylene carbonate mixed at a weight ratio of 1/1. The assembly was encapsulated in an aluminum laminated package under reduced pressure with the tabs being outside the aluminum package. The cells were produced each with one piece, two pieces or three pieces of the separator(s) within the aluminum foil. The cells were placed in a thermostatic bath at 20° C., and the cells were measured for resistance by an alternating current impedance method with an amplitude of 10 mV and a frequency of 100 kHz. The resistance values of the cells thus measured were plotted against the number of pieces of the separators, and the plots were linearly approximated to provide the gradient. The gradient was multiplied by the electrode area, i.e., 2.0 cm×1.4 cm, to provide the membrane resistance (ohm·$cm^2$) per one piece of the separator.

Heat Contraction Ratio

The polyethylene microporous membrane base was cut into a dimension of 18 cm (MD)×6 cm (TD). Marks were attached to the positions (point A and point B) on the line bisecting the TD at 2 cm and 17 cm from the upper edge, respectively. Furthermore, marks were attached to the positions (point C and point D) on the line bisecting the MD at 1 cm and 5 cm from the left edge, respectively. A clip was attached to the specimen (the position where the clip was attached was a position within the area of 2 cm in the MD from the upper edge), which was hanged in an oven adjusted to 105° C. for subjecting a heat treatment for 30 minutes without tension. The distances between the points A and B and between the points C and D were measured before and after the heat treatment, and the heat contraction ratio was obtained by the expressions 4 and 5 below.

heat contraction ratio in $MD$=((distance $AB$ before heat treatment−distance $AB$ after heat treatment)/ distance $AB$ before heat treatment)×100 (4)

heat contraction ratio in $TD$=((distance $CD$ before heat treatment−distance $CD$ after heat treatment)/ distance $CD$ before heat treatment)×100 (5)

Piercing Strength

A piercing test was performed with a handy compression tester KES-G5, produced by Kato Tech Co., Ltd., under conditions of a curvature radius of the probe tip of 0.5 mm and a piercing speed of 2 mm/sec, and the maximum piercing load was designated as the piercing strength. The specimen was fixed being held in a metallic frame having a hole with a diameter of 11.3 mm (specimen holder) together with silicone rubber packing.

Example 1

GUR2126 (weight average molecular weight: 4,150,000, melting point: 141° C.) and GURX143 (weight average molecular weight: 560,000, melting point: 135° C.), produced by Ticona, were used as polyethylene powder. GUR2126 and GURX143 in a ratio of 1/9 (weight ratio) were dissolved in a mixed solvent of liquid paraffin (Smoil P-350P, produced by Matsumura Oil Co., Ltd., boiling point: 480° C.) and decalin to a polyethylene concentration of 30% by weight to produce a polyethylene solution. The polyethylene solution had a composition of polyethylene/liquid paraffin/decalin=30/45/25 (weight ratio). The polyethylene solution was extruded from a die at 148° C. and cooled in a water bath to produce a gel tape (base tape). The base tape was dried at 60° C. for 8 minutes and at 95° C. for 15 minutes, and the base tape was stretched by biaxial stretching where longitudinal stretching and transversal stretching were performed sequentially. The longitudinal stretching was 5.5 times at a stretching temperature of 90° C., and the transversal stretching was 11.0 times at a stretching temperature of 105° C. After the transversal stretching, thermal fixation was performed at 125° C. The base tape was then immersed in a methylene chloride bath to extract liquid paraffin and decalin. Thereafter, the base tape was dried at 50° C. and subjected to an annealing process at 120° C. to provide a polyethylene microporous membrane. The properties of the resulting polyethylene microporous membrane are shown in Table 1.

Example 2

GUR2126 (weight average molecular weight: 4,150,000, melting point: 141° C.) and GURX143 (weight average molecular weight: 560,000, melting point: 135° C.), produced by Ticona, were used as polyethylene powder. GUR2126 and GURX143 in a ratio of 3/7 (weight ratio) were dissolved in a mixed solvent of liquid paraffin (Smoil P-350P, produced by Matsumura Oil Co., Ltd., boiling point: 480° C.) and decalin to a polyethylene concentration of 25% by weight to produce a polyethylene solution. The polyethylene solution had a composition of polyethylene/liquid paraffin/decalin=25/37.5/37.5 (weight ratio). The polyethylene solution was extruded from a die at 148° C. and cooled in a water bath to produce a gel tape (base tape). The base tape was dried at 60° C. for 8 minutes and at 95° C. for 15 minutes, and the base tape was stretched by biaxial stretching where longitudinal stretching and transversal stretching were performed sequentially. The longitudinal stretching was 5.5 times at a stretching temperature of 90° C., and the transversal stretching was 11.0 times at a stretching temperature of 105° C. After the transversal stretching, thermal fixation was performed at 125° C. The base tape was then immersed in a methylene chloride bath to extract liquid paraffin and decalin. Thereafter, the base tape was dried at 50° C. and subjected to an annealing process at 120° C. to provide a polyethylene microporous membrane. The properties of the resulting polyethylene microporous membrane are shown in Table 1.

Example 3

GUR2126 (weight average molecular weight: 4,150,000, melting point: 141° C.) and GURX143 (weight average molecular weight: 560,000, melting point: 135° C.), produced by Ticona, were used as polyethylene powder. GUR2126 and GURX143 in a ratio of 5/5 (weight ratio) were dissolved in a mixed solvent of liquid paraffin (Smoil P-350P, produced by Matsumura Oil Co., Ltd., boiling point: 480° C.) and decalin to a polyethylene concentration of 21% by weight to produce a polyethylene solution. The polyethylene solution had a composition of polyethylene/liquid paraffin/decalin=21/31.5/47.5 (weight ratio). The polyethylene solution was extruded from a die at 148° C. and cooled in a water bath to produce a gel tape (base tape). The base tape was dried at 60° C. for 8 minutes and at 95° C. for 15 minutes, and the base tape was stretched by biaxial stretching where longitudinal stretching and transversal stretching were performed sequentially. The longitudinal stretching was 5.5 times at a stretching temperature of 90° C., and the transversal stretching was 11.0 times at a stretching temperature of 105° C. After the transversal stretching, thermal fixation was performed at 125° C. The base tape was then immersed in a methylene chloride bath to extract liquid paraffin and decalin. Thereafter, the base tape was dried at 50° C. and subjected to an annealing process at 120° C. to provide a polyethylene microporous membrane. The properties of the resulting polyethylene microporous membrane are shown in Table 1.

Example 4

GUR2126 (weight average molecular weight: 4,150,000, melting point: 141° C.) and GURX143 (weight average molecular weight: 560,000, melting point: 135° C.), produced by Ticona, were used as polyethylene powder. GUR2126 and GURX143 in a ratio of 7/3 (weight ratio) were dissolved in a mixed solvent of liquid paraffin (Smoil P-350P, produced by Matsumura Oil Co., Ltd., boiling point: 480° C.) and decalin to a polyethylene concentration of 17% by weight to produce a polyethylene solution. The polyethylene solution had a composition of polyethylene/liquid paraffin/decalin=17/51/32 (weight ratio). The polyethylene solution was extruded from a die at 148° C. and cooled in a water bath to produce a gel tape (base tape). The base tape was dried at 60° C. for 8 minutes and at 95° C. for 15 minutes, and the base tape was stretched by biaxial stretching where longitudinal stretching and transversal stretching were performed sequentially. The longitudinal stretching was 5.5 times at a stretching temperature of 90° C., and the transversal stretching was 11.0 times at a stretching temperature of 105° C. After the transversal stretching, thermal fixation was performed at 125° C. The base tape was then immersed in a methylene chloride bath to extract liquid paraffin and decalin. Thereafter, the base tape was dried at 50° C. and subjected to an annealing process at 120° C. to provide a polyethylene microporous membrane. The properties of the resulting polyethylene microporous membrane are shown in Table 1.

Example 5

GUR2126 (weight average molecular weight: 4,150,000, melting point: 141° C.) and GURX143 (weight average molecular weight: 560,000, melting point: 135° C.), produced by Ticona, were used as polyethylene powder. GUR2126 and GURX143 in a ratio of 3/7 (weight ratio) were dissolved in a mixed solvent of liquid paraffin (Smoil P-350P, produced by Matsumura Oil Co., Ltd., boiling point: 480° C.) and decalin to a polyethylene concentration of 25% by weight to produce a polyethylene solution. The polyethylene solution had a composition of polyethylene/liquid paraffin/decalin=21/31.5/47.5 (weight ratio). The polyethylene solution was extruded from a die at 148° C. and cooled in a water bath to produce a gel tape (base tape). The base tape was dried at 60° C. for 8 minutes and at 95° C. for 15 minutes, and the base tape was stretched by biaxial stretching where longitudinal stretching and transversal stretching were performed sequentially. The longitudinal stretching was 5.5 times at a stretching temperature of 90° C., and the transversal stretching was 11.0 times at a stretching temperature of 105° C. After the transversal stretching, thermal fixation was performed at 125° C. The base tape was then immersed in a methylene chloride bath to extract liquid paraffin and decalin. Thereafter, the base tape was dried at 50° C. and subjected to an annealing process at 120° C. to provide a polyethylene microporous membrane. The properties of the resulting polyethylene microporous membrane are shown in Table 1.

Nonaqueous Secondary Battery Separator

In the examples, the properties of the nonaqueous secondary battery separator were measured in the following manners.

Coated Amount

A nonaqueous secondary battery separator, which was produced in the same manner as in the measurement of the weight per unit of the polyethylene microporous membrane base, was measured for weight per unit. A value obtained by subtracting the weight per unit of the polyethylene microporous membrane base from the weight per unit of the nonaqueous secondary battery separator was designated as the coated amount.

Thickness

The thickness was measured in the same manner as in the polyethylene microporous membrane base.

Air Permeability

The air permeability was measured according to JIS P8117.

Membrane Resistance

The membrane resistance was measured in the same manner as in the polyethylene microporous membrane base.

Heat Contraction Ratio

The heat contraction ratio was measured in the same manner as in the polyethylene microporous membrane base except that the treating temperature was 175° C.

Shutdown (SD) Characteristics

A separator was punched out in a size of 19 mm in diameter, and immersed in a methanol solution having 3% by weight of a nonionic surfactant (Emulgen 210P, produced by Kao Corporation) dissolved therein, followed by air drying. The separator was impregnated with an electrolytic solution and held by SUS plates (diameter: 15.5 mm). The electrolytic solution was obtained by dissolving $LiBF_4$ in a concentration of 1 M in a solvent containing propylene carbonate and ethylene carbonate mixed at a weight ratio of 1/1. The assembly was encapsulated in a 2032 type coin cell. Lead wires were drawn from the coin cell, which were attached with a thermocouple and the coin cell was placed in an oven. The temperature was increased at a temperature increasing rate of 1.6° C./min, and simultaneously the cell was applied with an alternating electric current having an amplitude of 10 mV and a frequency of 1 kHz, thereby measuring the resistance of the cell. At the time when the resistance of the cell reached $10^4$ ohm·cm$^2$ or more, it was determined that shutdown occurred, and the temperature at that time was designated as the shutdown temperature. The shutdown characteristics were determined as "good" in the case where the resistance of the cell was maintained $10^3$ ohm·cm$^2$ or more until 200° C. The case where shutdown (SD) did not occur, and the case where the resistance of the cell became less than $10^3$ ohm·cm$^2$ before reaching 200° C. were determined as "poor".

Examples 6 to 10

Conex (a trade name by Teijin Techno Products, Ltd.) as meta-type wholly aromatic polyamide and alumina (AL-160SG-3, produced by Showa Denko K.K.) having an average particle diameter of 0.6 μm were adjusted to a weight ratio of 15/85 and were mixed with a mixed solvent containing dimethylacetamide (DMAc) and tripropylene glycol (TPG) at a weight ratio of 50/50 to a concentration of Conex of 5.5% by weight, thereby producing a coating liquid. Two Meyer bars were disposed to face each other, on which an appropriate amount of the coating liquid was placed. The polyethylene microporous membrane bases produced in Examples 1 to 5 were each passed through the Meyer bars having the coating liquid placed thereon, thereby coating the coating liquid on both the front and back surfaces of the bases. The gap between the Meyer bars was 20 μm, and the count of the Meyer bars used was #6 for both the bars. The bases each were immersed in a coagulation liquid at a weight ratio of water/DMAc/TPG of 50/25/25 at 40° C., and then rinsed with water and dried to form a heat resistant porous layers on both the front and back surfaces of the polyethylene microporous membrane base. The properties of the resulting nonaqueous secondary battery separators of Examples 6 to 10 are shown in Table 2.

Examples 11 to 15

Conex (a trade name by Teijin Techno Products, Ltd.) as meta-type wholly aromatic polyamide was mixed with a mixed solvent containing dimethylacetamide (DMAc) and tripropylene glycol (TPG) at a weight ratio of 60/40 to a concentration of Conex of 6.0% by weight, thereby producing a coating liquid. Two Meyer bars were disposed to face each other, on which an appropriate amount of the coating liquid was placed. The polyethylene microporous membranes produced in Examples 1 to 5 were each passed through the Meyer bars having the coating liquid placed thereon, thereby coating the coating liquid on both the front and back surfaces of the membranes. The gap between the Meyer bars was 20 μm, and the count of the Meyer bars used was #6 for both the bars. The membranes each were immersed in a coagulation liquid at a weight ratio of water/DMAc/TPG of 50/30/20 at 40° C., and then rinsed with water and dried to form a heat resistant porous layers on both the front and back surfaces of the polyethylene microporous membrane. The properties of the resulting nonaqueous secondary battery separators of Examples 11 to 15 are shown in Table 2.

Comparative Examples 1 to 4

As comparative bases, as shown in Table 1, the polyethylene microporous membrane A for a lithium ion secondary battery separator (Model SV781, produced by Asahi Kasei Chemicals Corporation), B (Model E16MMS, produced by Tonen Chemical Corporation), C (Model F12BMS, produced by Asahi Kasei Chemicals Corporation) and D (Model NR312, produced by Asahi Kasei Chemicals Corporation) were used. The properties of the comparative bases A to D are shown in Table 1. The heat resistant porous layers were formed on both the front and back surfaces of each of the comparative bases A to D in the same manner as in Examples 6 to 10. The gap between the Meyer bars was 30 μm for the comparative bases A and B. The properties of the resulting nonaqueous secondary battery separators of Comparative Examples 1 to 4 are shown in Table 2.

Comparative Examples 5 to 8

The heat resistant porous layers were formed on both the front and back surfaces of each of the comparative bases A to D having the properties shown in Table 1 in the same manner as in Examples 11 to 15. The gap between the Meyer bars was 30 μm for the comparative bases A and B. The properties of the resulting nonaqueous secondary battery separators of Comparative Examples 5 to 8 are shown in Table 2.

TABLE 1

|  | Thickness μm | Porosity % | Air permeability (X) sec/100 cc | Air permeability sec/100 cc · μm | Membrane resistance (Y) ohm · cm² | Y/X ohm · cm²/ (sec/100 cc) | Heat contraction ratio % MD | Heat contraction ratio % TD | piercing strength g |
|---|---|---|---|---|---|---|---|---|---|
| Example 1 | 11.5 | 36 | 301 | 26 | 2.641 | $8.8 \times 10^{-3}$ | 28.3 | 6.7 | 380 |
| Example 2 | 10.5 | 36 | 306 | 29 | 2.501 | $8.1 \times 10^{-3}$ | 29.2 | 8.0 | 393 |
| Example 3 | 12.0 | 37 | 351 | 29 | 2.580 | $7.3 \times 10^{-3}$ | 24.9 | 8.5 | 475 |
| Example 4 | 14.7 | 47 | 199 | 14 | 1.960 | $9.8 \times 10^{-3}$ | 25.5 | 11.9 | 511 |
| Example 5 | 10.9 | 41 | 250 | 23 | 2.190 | $8.8 \times 10^{-3}$ | 25.7 | 6.8 | 344 |
| Comparative base A | 18.0 | 50 | 88 | 5 | 4.549 | $5.1 \times 10^{-2}$ | 2.3 | 1.7 | 340 |
| Comparative base B | 16.0 | 31 | 421 | 26 | 5.101 | $1.2 \times 10^{-2}$ | 4.5 | 3.4 | 409 |
| Comparative base C | 11.0 | 33 | 319 | 29 | 3.648 | $1.1 \times 10^{-2}$ | 5.0 | 3.5 | 443 |
| Comparative base D | 12.0 | 32 | 240 | 20 | 3.678 | $1.5 \times 10^{-2}$ | 5.4 | 3.2 | 302 |

TABLE 2

|  | Base | Coated amount g/m² | Thickness μm | Air permeability sec/100 cc | Membrane resistance ohm · cm² | Heat contraction ratio % MD | Heat contraction ratio % TD | SD characteristics |
|---|---|---|---|---|---|---|---|---|
| Example 6 | Example 1 | 10.32 | 24.5 | 351 | 3.711 | 13.7 | 17.5 | good (144° C.) |
| Example 7 | Example 2 | 11.07 | 23.8 | 349 | 3.610 | 14.7 | 18.5 | good (145° C.) |
| Example 8 | Example 3 | 7.83 | 20.8 | 396 | 3.745 | 18.3 | 21.3 | good (145° C.) |
| Example 9 | Example 4 | 8.07 | 20.5 | 278 | 3.200 | 18.4 | 20.4 | good (147° C.) |
| Example 10 | Example 5 | 10.50 | 24.1 | 315 | 3.543 | 13.9 | 18.3 | good (145° C.) |
| Example 11 | Example 1 | 2.56 | 15.6 | 400 | 3.834 | 16.5 | 23.5 | good (144° C.) |
| Example 12 | Example 2 | 2.48 | 14.7 | 401 | 3.795 | 17.8 | 24.8 | good (145° C.) |
| Example 13 | Example 3 | 2.69 | 17.0 | 455 | 3.855 | 19.6 | 22.6 | good (146° C.) |
| Example 14 | Example 4 | 2.85 | 20.3 | 295 | 3.254 | 16.3 | 22.5 | good (147° C.) |
| Example 15 | Example 5 | 2.77 | 16.2 | 349 | 3.612 | 16.9 | 22.9 | good (145° C.) |
| Comparative Example 1 | Comparative base A | 12.72 | 22.8 | 236 | 6.857 | 30.9 | 4.5 | poor * |
| Comparative Example 2 | Comparative base B | 8.10 | 21.9 | 598 | 6.258 | 21.8 | 18.5 | good (141° C.) |
| Comparative Example 3 | Comparative base C | 7.31 | 16.3 | 455 | 5.293 | 21.2 | 18.3 | good (147° C.) |
| Comparative Example 4 | Comparative base D | 6.87 | 19.1 | 354 | 5.322 | 22.0 | 13.3 | good (152° C.) |
| Comparative Example 5 | Comparative base A | 2.05 | 21.0 | 195 | 6.400 | 63.8 | 6.7 | poor * |
| Comparative Example 6 | Comparative base B | 2.50 | 22.0 | 622 | 6.737 | 27.3 | 20.0 | good (144° C.) |
| Comparative Example 7 | Comparative base C | 3.02 | 18.0 | 467 | 5.073 | 20.7 | 10.1 | good (150° C.) |
| Comparative Example 8 | Comparative base D | 2.40 | 18.0 | 399 | 5.438 | 22.4 | 13.4 | poor * |

* Shutdown did not occur.

INDUSTRIAL APPLICABILITY

According to the invention, such a nonaqueous secondary battery separator is obtained that is excellent in shutdown characteristics and has high heat resistance and low membrane resistance, and thus it is effective for enhancing the capability of a nonaqueous secondary battery and assuring the safety thereof.

The invention claimed is:

1. A nonaqueous secondary battery separator comprising a polyolefin microporous membrane base, and
a heat resistant porous layer formed on at least one surface of the membrane base and made of a heat resistant resin having a melting point of 200° C. or more, wherein the membrane base has
(A) a thickness of 5 to 20 μm,
(B) a porosity of 35 to 50%,
(C) an air permeability per unit thickness (JIS P8117) of 10 to 30 sec/100 cc·μm and a total air permeability of the membrane (JIS P8117) of 400 sec/100 cc or less, and
(D) Y/X of $1 \times 10^{-3}$ to $1 \times 10^{-2}$ ohm·cm²/(sec/100 cc), wherein the air permeability (JIS P8117) is represented by X sec/100 cc, and the membrane resistance upon impregnating the polyolefin microporous membrane with an electrolytic solution is represented by Y ohm·cm².

2. The nonaqueous secondary battery separator according to claim 1, characterized in that the membrane base has a heat contraction ratio at 105° C. in one of MD and TD of 20 to 40%.

3. The nonaqueous secondary battery separator according to claim 1, characterized in that the membrane base has a piercing strength of 300 g or more.

4. The nonaqueous secondary battery separator according to claim 1, characterized in that the polyolefin is polyethylene.

5. The nonaqueous secondary battery separator according to claim 1, characterized in that the heat resistant resin is at least one selected from the group consisting of wholly aromatic polyamide, polyimide, polyamideimide, polysulfone, polyketone, polyetherketone, polyetherimide and cellulose.

6. The nonaqueous secondary battery separator according to claim 5, characterized in that the heat resistant resin is meta-type aromatic polyamide.

7. The nonaqueous secondary battery separator according to claim 1, characterized in that the heat resistant porous layer contains an inorganic filler.

8. The nonaqueous secondary battery separator according to claim 7, characterized in that the inorganic filler is at least one selected from the group consisting of a metallic oxide, a metallic nitride, a metallic carbide, a metallic hydroxide, a carbonate salt and a sulfate salt.

9. The nonaqueous secondary battery separator according to claim 8, characterized in that the inorganic filler is alumina.

10. The nonaqueous secondary battery separator according to claim 1, characterized in that the heat resistant porous layer is formed by: providing a coating liquid by dissolving the heat resistant resin in a solvent; coating the coating liquid on at least one surface of the polyolefin microporous membrane base; and integrating the coating liquid to the polyolefin microporous membrane base by coagulating, rinsing with water, and drying.

11. The nonaqueous secondary battery separator according to claim 10, characterized in that the coating liquid is a slurry having an inorganic filler dispersed therein.

12. A nonaqueous secondary battery containing a positive electrode, a negative electrode, a separator provided between the electrodes, and a nonaqueous electrolytic solution, characterized in that the separator is the nonaqueous secondary battery separator according to claim 1.

* * * * *